US011099578B2

(12) United States Patent
Ogihara et al.

(10) Patent No.: US 11,099,578 B2
(45) Date of Patent: Aug. 24, 2021

(54) WORK MACHINE MANAGEMENT SYSTEM

(71) Applicant: Komatsu Ltd., Tokyo (JP)

(72) Inventors: Masanori Ogihara, Tokyo (JP); Koji Takeda, Tokyo (JP); Tomonori Ozaki, Tokyo (JP); Akiharu Nishijima, Tokyo (JP); Ryuuen Kou, Tokyo (JP)

(73) Assignee: Komatsu LTD., Tokyo (JP)

( * ) Notice: Subject to any disclaimer, the term of this patent is extended or adjusted under 35 U.S.C. 154(b) by 297 days.

(21) Appl. No.: 16/084,037

(22) PCT Filed: Dec. 26, 2016

(86) PCT No.: PCT/JP2016/088780
§ 371 (c)(1),
(2) Date: Sep. 11, 2018

(87) PCT Pub. No.: WO2017/168894
PCT Pub. Date: Oct. 5, 2017

(65) Prior Publication Data
US 2020/0293062 A1 Sep. 17, 2020

(30) Foreign Application Priority Data

Mar. 31, 2016 (JP) .............................. JP2016-070234

(51) Int. Cl.
G05D 1/02 (2020.01)
E02F 9/20 (2006.01)
E02F 9/26 (2006.01)

(52) U.S. Cl.
CPC ......... G05D 1/0278 (2013.01); G05D 1/0274 (2013.01); E02F 9/2054 (2013.01);
(Continued)

(58) Field of Classification Search
CPC ............. G05D 2201/021; G05D 1/027; G05D 1/0274; G05D 1/0278; E02F 9/26; E02F 9/2054
See application file for complete search history.

(56) References Cited

U.S. PATENT DOCUMENTS 5,512,904 A * 4/1996 Bennett ................. G01C 21/28
342/357.32
6,356,189 B1 * 3/2002 Fujimaki ............... G08G 1/162
340/465

(Continued)

FOREIGN PATENT DOCUMENTS

AU 2015362375 B2 6/2016
DE 102009047436 A1 * 6/2011 ............. B60Q 1/346

(Continued)

OTHER PUBLICATIONS

Gian Antonio D'addetta, Method for resetting and/or setting blinker system of vehicle i.e. commercial motor vehicle, involves detecting completed and/or forthcoming direction change by comparing location data of vehicle with map data, 2011 (Year: 2011).*

(Continued)

Primary Examiner — Jeff A Burke
Assistant Examiner — Jamal A Shah
(74) Attorney, Agent, or Firm — Locke Lord LLP

(57) ABSTRACT

A work machine management system includes: an input data acquisition unit that acquires input data generated by an operation of an input device; a turn signal data setting unit that sets turn signal data for controlling a direction indicator of a work machine to each of a plurality of courses branching from an intersection based on the input data; and an output unit that outputs the turn signal data to the work machine.

7 Claims, 11 Drawing Sheets

(52) U.S. Cl.
CPC ............... *E02F 9/26* (2013.01); *G05D 1/027* (2013.01); *G05D 2201/021* (2013.01)

(56) References Cited

U.S. PATENT DOCUMENTS

| | | | |
|---|---|---|---|
| 6,539,294 B1 | 3/2003 | Kageyama | |
| 8,498,778 B2 | 7/2013 | Seymour et al. | |
| 9,550,499 B2 | 1/2017 | Sakai | |
| 2005/0162266 A1* | 7/2005 | Mills | B60Q 1/40 340/476 |
| 2006/0167602 A1* | 7/2006 | Matsumoto | B60Q 1/346 701/36 |
| 2011/0106376 A1* | 5/2011 | Tijerina | B60Q 1/40 701/36 |
| 2012/0001769 A1* | 1/2012 | Nitanda | G01S 17/931 340/901 |
| 2012/0271510 A1* | 10/2012 | Seymour | B60Q 1/346 701/36 |
| 2015/0022336 A1* | 1/2015 | Mueller | B60R 1/00 340/477 |

FOREIGN PATENT DOCUMENTS

| | | |
|---|---|---|
| JP | 63-307506 A | 12/1988 |
| JP | 05-324058 A | 12/1993 |
| JP | 11-296229 A | 10/1999 |
| JP | 2010-202021 A | 9/2010 |
| WO | 2015/033708 A1 | 3/2015 |

OTHER PUBLICATIONS

Office Action dated May 10, 2019, issued in the corresponding Australian patent application No. 2016400806.
International Search Report dated Feb. 7, 2017, issued for PCT/JP2016/088780.
Office Action dated Jun. 16, 2020, issued in the corresponding Canadian patent application No. 3,017,289.

* cited by examiner

WORK MACHINE MANAGEMENT SYSTEM

FIELD

The present invention relates to a work machine management system.

BACKGROUND

There is a case where both a work machine that travels in an unattended manner and a manned vehicle operate in the same mine. If a driver operating the manned vehicle can grasp a traveling direction of a mining machine that travels in an unattended manner at an intersection, for example, the safety in a mine is improved. Patent Literature 1 discloses a technique of a direction indication scheme in an autonomous traveling automatic guided vehicle.

CITATION LIST

Patent Literature

Patent Literature 1: Japanese Laid-open Patent Publication No. 05-324058 A

SUMMARY

Technical Problem

It is considered that the use of a direction indicator contributes to improvement of the safety in the mine. However, a technique of using the direction indicator in the work machine that travels in an unattended manner has not been established.

An aspect of the present invention aims to provide a work machine management system capable of improving safety in a mine.

Solution to Problem

According to an embodiment of the present invention, a work machine management system comprises: an input data acquisition unit that acquires input data generated by an operation of an input device; a turn signal data setting unit that sets turn signal data for controlling a direction indicator of a work machine to each of a plurality of courses branching from an intersection based on the input data; and an output unit that outputs the turn signal data to the work machine.

Advantageous Effects of Invention

According to an aspect of the present invention, a work machine management system capable of improving the safety in the mine is provided.

DESCRIPTION OF EMBODIMENTS

Hereinafter, embodiments of the present invention will be described with reference to the drawings, but the present invention is not limited thereto.

First Embodiment

Figure 1:
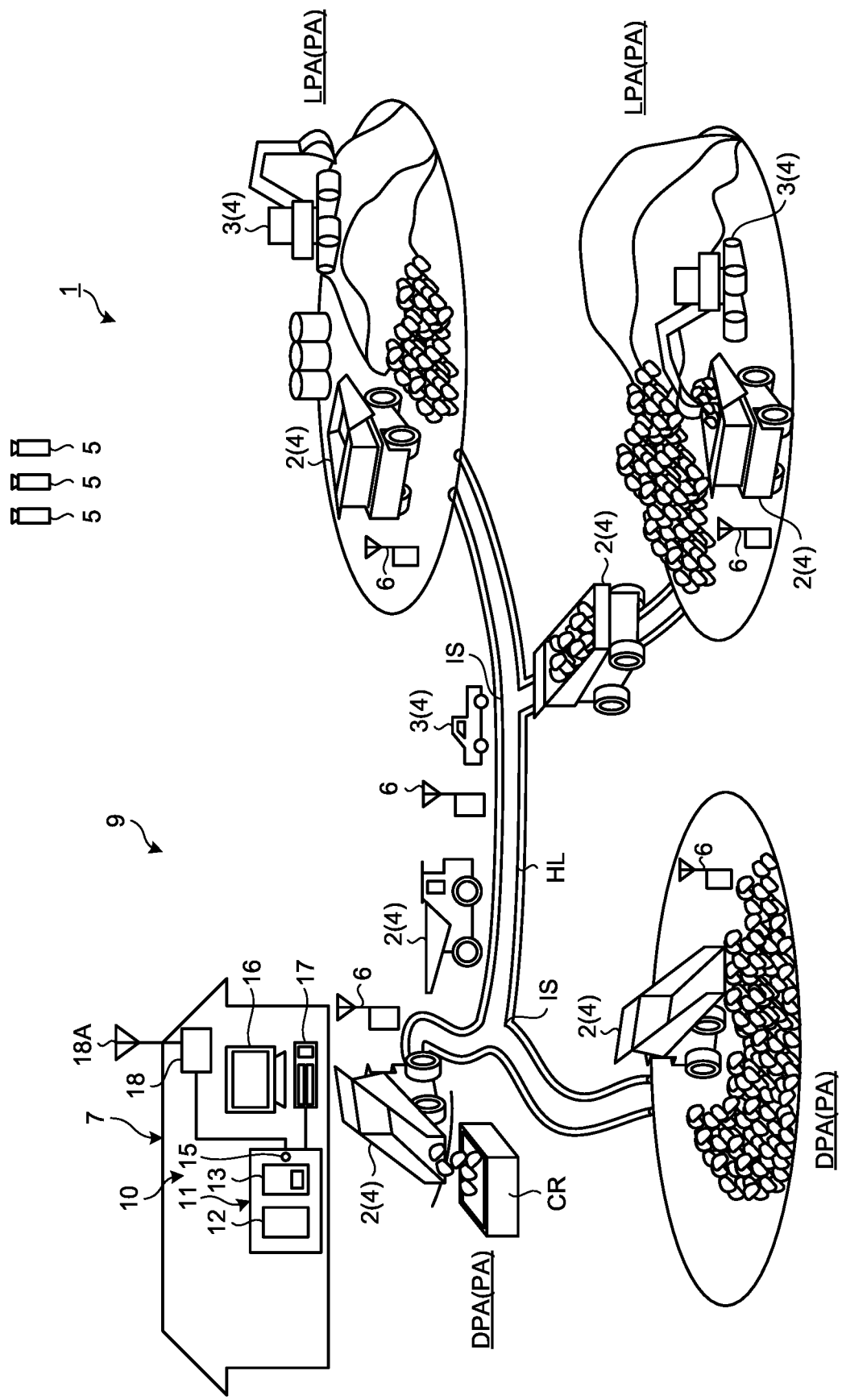
FIG. 1 is a view schematically illustrating an example of a management system of a mining machine according to a first embodiment.

A first embodiment will be described. FIG. 1 is a view illustrating an example of a management system 1 of a work machine according to the present embodiment. In the present embodiment, an example in which the work machine is a mining machine 4 operating in a mine will be described. The management system 1 performs management of the mining machine 4. The management of the mining machine 4 includes at least one of operation management of the mining machine 4, evaluation of the productivity of the mining machine 4, the evaluation of an operation technique of an operator of the mining machine 4, preservation of the mining machine 4, and abnormality diagnosis of the mining machine 4.

The mining machine 4 is a generic term of machinery used in various operations in the mine. The mining machine 4 includes at least one of a boring machine, an excavation machine, a loading machine, a transporting machine, a crusher, and a vehicle operated by a driver. The excavation machine is a mining machine for excavating the mine. The loading machine is a mining machine for loading a load on the transporting machine. The loading machine includes at least one of an excavator, an electric excavator, and a wheel loader. The transporting machine is a mining machine for transporting a load. The crusher is a mining machine that crushes earth charged from the transporting machine. The mining machine 4 is movable in the mine.

In the present embodiment, the mining machine 4 includes a dump truck 2 which is the transporting machine capable of traveling in the mine, and other mining machines 3 different from the dump truck 2. In the present embodiment, an example in which the dump truck 2 is mainly managed by the management system 1 will be described.

As illustrated in FIG. 1, the dump truck 2 travels at least a part of a work site PA of the mine and a transport path HL leading to the work site PA. The work site PA includes at least one of a loading site LPA and a discharging site DPA. The transport path HL includes an intersection IS. The dump truck 2 travels in accordance with course data indicating a target traveling route set in the transport path HL and the work site PA.

The loading site LPA is a range in which a loading operation of loading a load onto the dump truck 2 is performed. The discharging site DPA is a range in which a discharging operation of discharging the load from the dump truck 2 is performed. In the example illustrated in FIG. 1, a crusher CR is provided in at least a part of the discharging site DPA.

In the present embodiment, a description will be given on the premise that the dump truck 2 is an unmanned dump truck that autonomously travels in the mine based on a command signal from a management device 10. The autonomous traveling of the dump truck 2 means traveling based on the command signal from the management device 10 without depending on the driver's operation.

In FIG. 1, the management system 1 includes the management device 10 disposed in a control facility 7 installed in the mine, and a communication system 9. The communication system 9 has a plurality of repeaters 6 that relay data or a command signal. The communication system 9 wirelessly communicates data or a command signal between the management device 10 and the mining machine 4. In addition, the communication system 9 wirelessly communicates data or a command signal among the plurality of mining machines 4.

In the present embodiment, a position of the dump truck 2 and a position of the other mining machine 3 are detected using a global navigation satellite system (GNSS). The GNSS is a global navigation satellite system. An example of the global navigation satellite system is a global positioning system (GPS). The GNSS has a plurality of positioning satellites 5. The GNSS detects a position defined by coordinate data of a latitude, a longitude, and an altitude. The position detected by the GNSS is an absolute position defined in a global coordinate system. The position of the dump truck 2 and the position of the other mining machine 3 in the mine are detected by the GNSS.

In the following description, the position detected by the GNSS will be referred to as a GPS position as appropriate. The GPS position is an absolute position and includes coordinate data of a latitude, a longitude, and an altitude. The absolute position includes an estimated position of the dump truck 2 estimated with high accuracy.

Next, the management device 10 will be described. The management device 10 transmits data or a command signal to the mining machine 4 and receives data from the mining machine 4. As illustrated in FIG. 1, the management device 10 includes a computer 11, a display device 16, an input device 17, and a wireless communication device 18.

The computer 11 includes a processing device 12, a storage device 13, and an input/output unit 15. The display device 16, the input device 17, and the wireless communication device 18 are connected to the computer 11 via the input/output unit 15.

The processing device 12 performs arithmetic processing for managing the mining machine 4. The storage device 13 is connected to the processing device 12 and stores data for managing the mining machine 4. The input device 17 is operated by an administrator to generate input data for managing the mining machine 4 and supplies the generated data to the processing device 12. The input device 17 includes at least one of a keyboard for a computer, a mouse, and a touch sensor provided on a display screen of the display device 16, for example. The display device 16 includes a flat panel display such as a liquid crystal display. The processing device 12 performs the arithmetic processing using data stored in the storage device 13, data input from the input device 17, and data acquired via the communication system 9. The display device 16 displays a result of the arithmetic processing of the processing device 12 and the like.

The wireless communication device 18 has an antenna 18A and is disposed in the control facility 7. The wireless communication device 18 is connected to the processing device 12 via the input/output unit 15. The communication system 9 includes the wireless communication device 18. The wireless communication device 18 is capable of receiving data transmitted from the mining machine 4. The data received by the wireless communication device 18 is output to the processing device 12 and stored in the storage device 13. The wireless communication device 18 is capable of transmitting data to the mining machine 4.

Figure 2:
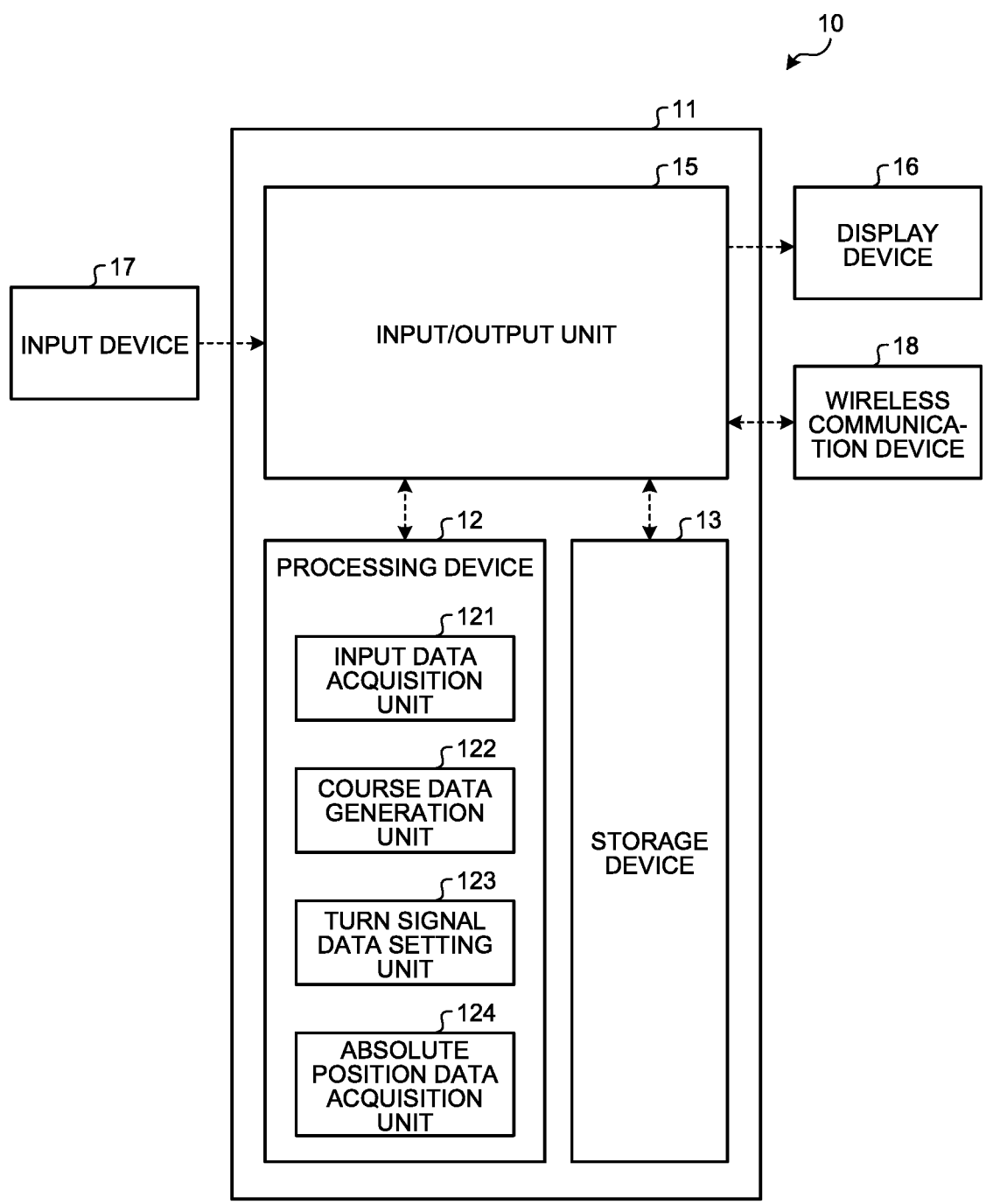
FIG. 2 is a functional block diagram illustrating an example of a management device of the management system of the mining machine according to the first embodiment.

FIG. 2 is a functional block diagram illustrating an example of the management device 10 according to the present embodiment. As illustrated in FIG. 2, the processing device 12 of the management device 10 includes: an input data acquisition unit 121 that acquires input data generated by an operation of the input device 17; a course data generation unit 122 that generates course data of the dump truck 2 including the intersection IS and a plurality of courses branching from the intersection IS; a turn signal data setting unit 123 that sets turn signal data for controlling a direction indicator 37 of the dump truck 2 to each of the plurality of courses branching from the intersection IS based on the input data acquired by the input data acquisition unit 121; and an absolute position data acquisition unit 124 that acquires absolute position data of the dump truck 2. The turn signal data is output from the input/output unit 15 functioning as an output unit to the dump truck 2 via the wireless communication device 18. The course data generated by the course data generation unit 122 is stored in the storage device 13. In addition, the turn signal data is stored in the storage device 13.

Figure 3:
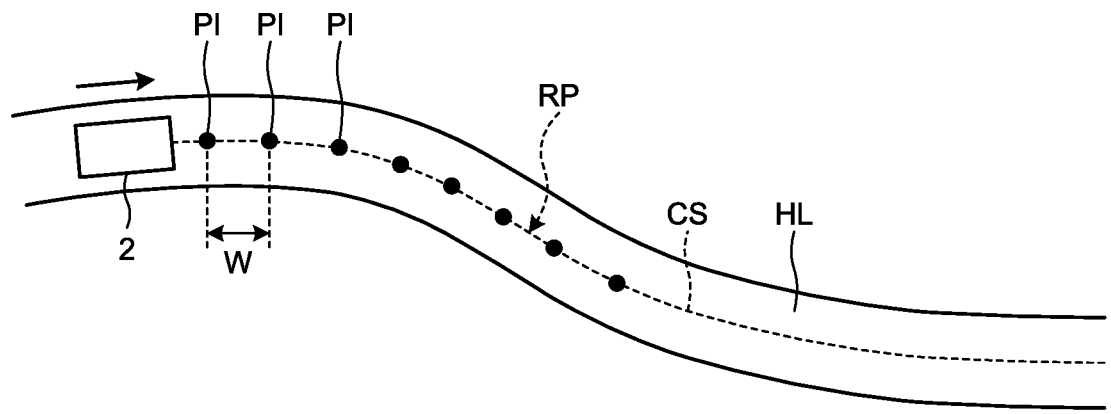
FIG. 3 is a schematic view for describing a target traveling route of a dump truck according to the first embodiment.

FIG. 3 is a schematic view illustrating the dump truck 2 traveling on the transport path HL. The course data generation unit 122 of the processing device 12 generates traveling condition data including the course data of the dump truck 2 traveling in the mine. The traveling condition data includes an aggregate of a plurality of course points PI set at a constant interval W.

Each of the plurality of course points PI includes target absolute position data of the dump truck 2, target traveling speed data of the dump truck 2 at a position where the course point PI has been set, and target orientation data of the dump truck 2 at the position where the course point PI has been set. A target traveling route RP is defined by course data CS which is the aggregate of the plurality of course points PI. The target traveling route RP of the dump truck 2 is defined by a trajectory passing through the plurality of course points PI. The target traveling speed of the dump truck 2 at the position where the course point PI has been set is defined based on the target traveling speed data. An orientation of the dump truck 2 at the position where the course point PI has been set is defined based on the target orientation data.

In addition, each of the plurality of course points PI includes turn signal data for controlling the direction indicator 37 of the dump truck 2. The turn signal data is data indicating an operation condition of the direction indicator 37 when the dump truck 2 passes through the position of the course point PI. The turn signal data includes data to turn on a turn signal lamp 37R for right turn of the direction indicator 37, data to turn on a turn signal lamp 37L for left turn of the direction indicator 37, data to simultaneously turn on the turn signal lamp 37R for right turn and the turn signal lamp 37L for left turn, and data to turn off the turn signal lamp 37R and the turn signal lamp 37L.

In the present embodiment, the turn signal data setting unit 123 sets the turn signal data to the course point PI based on the input data generated by the operation of the input device 17. That is, the turn signal data is set by an administrator who operates the input device 17 in the present embodiment. Each of the plurality of course points PI includes target absolute position data, target traveling speed data, target orientation data, and turn signal data.

The management device 10 outputs the traveling condition data including the plurality of course points PI on the front side in the traveling direction to the dump truck 2 via the wireless communication device 18. The dump truck 2 travels on the mine in accordance with the traveling condition data transmitted from the management device 10. In addition, the dump truck 2 controls the direction indicator 37 in accordance with the turn signal data transmitted from the management device 10.

Figure 4:
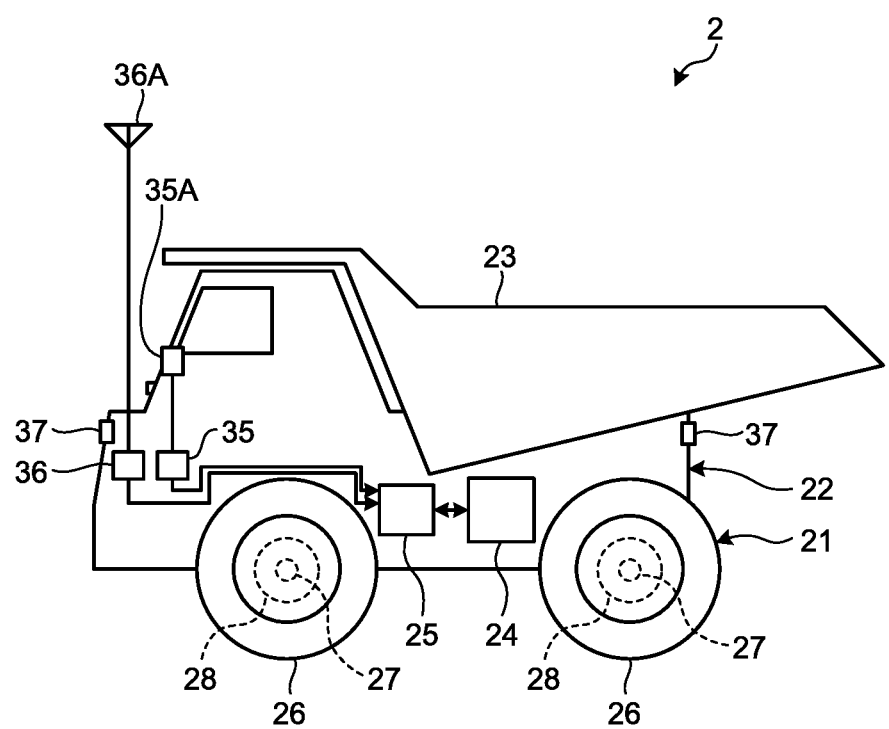
FIG. 4 is a view schematically illustrating an example of the dump truck according to the first embodiment.
Figure 5:
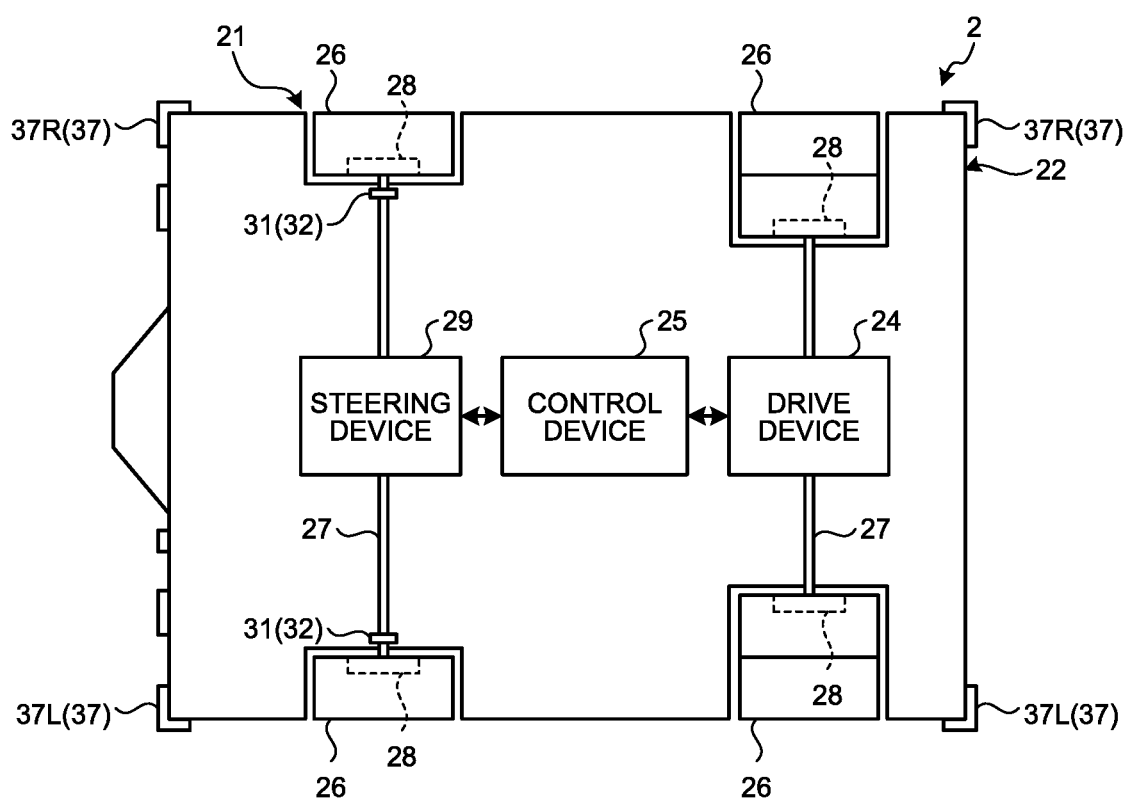
FIG. 5 is a view schematically illustrating an example of the dump truck according to the first embodiment.

Next, the dump truck 2 according to the present embodiment will be described. FIGS. 4 and 5 are views schematically illustrating an example of the dump truck 2 according to the present embodiment.

The dump truck 2 includes a traveling device 21 capable of traveling on the mine, a vehicle body 22 supported by the traveling device 21, a vessel 23 supported by the vehicle body 22, a drive device 24 for driving the traveling device 21, a direction indicator 37, and a control device 25.

The traveling device 21 has wheels 26, axles 27 rotatably supporting the wheels 26, a brake device 28 braking the traveling device 21, and a steering device 29 capable of adjusting the traveling direction.

The traveling device 21 is operated by a driving force generated by the drive device 24. The drive device 24 generates the driving force for accelerating the dump truck 2. The drive device 24 drives the traveling device 21 by an electric drive scheme. The drive device 24 has an internal combustion engine such as a diesel engine, a generator operated by motive power of the internal combustion engine, and an electric motor operated by power generated by the generator. The driving force generated by the electric motor is transmitted to the wheels 26 of the traveling device 21. As a result, the traveling device 21 is driven. The dump truck 2 autonomously travels by the driving force of the drive device 24 provided in the vehicle body 22. As the output of the drive device 24 is adjusted, the traveling speed of the dump truck 2 is adjusted. Incidentally, the drive device 24 may drive the traveling device 21 by a mechanical driving scheme. For example, the motive power generated by the internal combustion engine may be transmitted to the wheels 26 of the traveling device 21 via a power transmission device.

The steering device 29 is capable of adjusting the traveling direction of the traveling device 21. The traveling direction of the dump truck 2 including the traveling device 21 includes a direction of a front portion of the vehicle body 22. The steering device 29 adjusts the traveling direction of the dump truck 2 by changing the direction of the wheels 26.

The brake device 28 generates a braking force for decelerating or stopping the dump truck 2. The control device 25 outputs an accelerator command signal for operating the drive device 24, a brake command signal for operating the brake device 28, and a steering command signal for operating the steering device 29. The drive device 24 generates a driving force for accelerating the dump truck 2 based on the accelerator command signal output from the control device 25. The brake device 28 generates a braking force for decelerating the dump truck 2 based on the brake command signal output from the control device 25. The steering device 29 generates a force for changing a direction of the wheels 26 so as to make the dump truck 2 travel straight or swing based on the steering command signal output from the control device 25.

The direction indicator 37 displays the traveling direction of the dump truck 2. The direction indicator 37 is disposed at each of the front portion and a rear portion of the vehicle body 22. The direction indicator 37 includes the turn signal lamp and notifies the surroundings of the traveling direction of the dump truck 2 by causing the turn signal lamp to be turned on or blink. The direction indicator 37 includes the turn signal lamp 37R for right turn to be lighted when the dump truck 2 turns right and the turn signal lamp 37L for left turn to be lighted when the dump truck 2 turns left. The turn signal lamp 37R for right turn is disposed in a right portion of the vehicle body 22, and the turn signal lamp 37L for left turn is disposed in a left portion of the vehicle body 22.

In the following description, the lighting of the turn signal lamp 37R will be referred to as right-turn lighting as appropriate, and the lighting of the turn signal lamp 37L will be referred to as left-turn lighting as appropriate.

In addition, the dump truck 2 includes a traveling speed detector 31 that detects the traveling speed of the dump truck 2, an acceleration detector 32 that detects the acceleration of the dump truck 2, a position detector 35 that detects the position of the dump truck 2, and a wireless communication device 36.

The traveling speed detector 31 detects the traveling speed of the dump truck 2. The traveling speed detector 31 includes a rotation speed sensor that detects the rotation speed of the wheels 26. Since the rotation speed of the wheels 26 correlates with the traveling speed of the dump truck 2, a rotation speed value, which is a detection value of the rotation speed sensor, is converted into a traveling speed value of the dump truck 2. Incidentally, the traveling speed detector 31 may detect the rotation speed of the wheels 26.

The acceleration detector 32 detects the acceleration of the dump truck 2. The acceleration of the dump truck 2 includes a positive acceleration and a negative acceleration (deceleration). In the present embodiment, the arithmetic processing is executed based on the rotation speed value, which is the detection value of the rotation speed sensor that detects the rotation speed of the wheels 26, and thus, the rotation speed value is converted into an acceleration value of the dump truck 2. Incidentally, the traveling speed detector 31 and the acceleration detector 32 may be separate detectors.

The position detector 35 includes a GPS receiver and detects the GPS position (coordinates) of the dump truck 2. The position detector 35 has a GPS antenna 35A. The antenna 35A receives radio waves from the positioning satellite 5. The position detector 35 converts a signal based on the radio wave from the positioning satellite 5, received by the antenna 35A, into an electric signal to calculate a position of the antenna 35A. The GPS position of the dump truck 2 is detected by calculating the GPS position of the antenna 35A.

The communication system 9 includes the wireless communication device 36 provided in the dump truck 2. The wireless communication device 36 has an antenna 36A. The wireless communication device 36 can wirelessly communicate with the management device 10.

The management device 10 transmits a command signal including the traveling condition data of the dump truck 2 to the control device 25 via the communication system 9. The control device 25 controls at least one of the drive device 24, the brake device 28, and the steering device 29 of the dump truck 2 based on the traveling condition data supplied from the management device 10 such that the dump truck 2 travels in accordance with the traveling condition data (including the absolute position data, the target traveling speed, the target azimuth at the plurality of course points PI).

In addition, the dump truck 2 transmits the absolute position data indicating the absolute position of the dump truck 2 detected by the position detector 35 to the management device 10 via the communication system 9. The absolute position data acquisition unit 124 of the management device 10 acquires the absolute position data of the plurality of dump trucks 2 traveling on the mine. In addition, the absolute position data acquisition unit 124 of the management device 10 acquires the absolute position data of not only the dump truck 2 but also the other mining machine 3 including the position detector 35.

Figure 6:
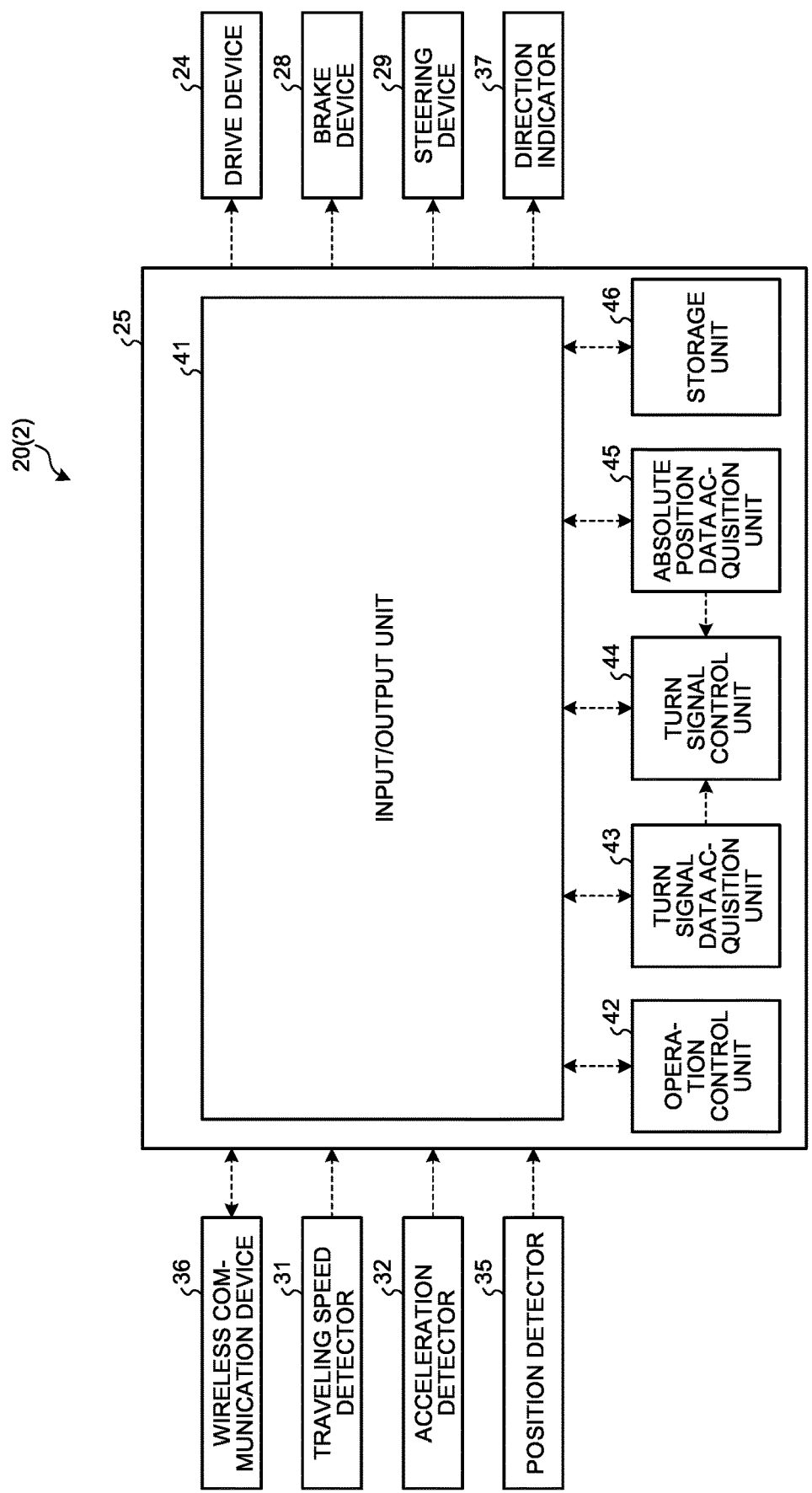
FIG. 6 is a functional block diagram illustrating an example of a control system of the dump truck according to the first embodiment.

Next, a control system 20 of the dump truck 2 according to the present embodiment will be described. FIG. 6 is a functional block diagram of the control system 20 according to the present embodiment. The control system 20 is mounted on the dump truck 2.

As illustrated in FIG. 6, the control system 20 includes a wireless communication device 36, a traveling speed detector 31, an acceleration detector 32, a position detector 35, a control device 25, a drive device 24, a brake device 28, a steering device 29, and the direction indicator 37.

The control device 25 includes an input/output unit 41, an operation control unit 42, a turn signal data acquisition unit 43, a turn signal control unit 44, an absolute position data acquisition unit 45, and a storage unit 46.

The input/output unit 41 acquires the turn signal data and traveling condition data output from the management device 10, the traveling speed data indicating a traveling speed of the dump truck 2 output from the traveling speed detector 31, acceleration data indicating an acceleration of the dump truck 2 output from the acceleration detector 32, and position data indicating the position of the dump truck 2 output from the position detector 35. In addition, the input/output unit 41 outputs an accelerator command signal to the drive device 24, outputs a brake command signal to the brake device 28, and outputs a steering command signal to the steering device 29.

The operation control unit 42 outputs an operation control signal to control the traveling device 21 of the dump truck 2 based on the designated traveling condition data. The traveling device 21 includes the brake device 28 and the steering device 29. The operation control unit 42 outputs an operation control signal to the traveling device 21 including the drive device 24, the brake device 28, and the steering device 29. The operation control signal includes an accelerator command signal output to the drive device 24, the brake command signal output to the brake device 28, and the steering command signal output to the steering device 29.

The turn signal data acquisition unit 43 acquires the turn signal data output from the management device 10 in order to control the direction indicator 37 of the dump truck 2.

The turn signal control unit 44 outputs a turn signal control signal to the direction indicator 37 provided on the dump truck 2 based on the turn signal data acquired by the turn signal data acquisition unit 43. The turn signal control signal includes a light-on signal to turn on the direction indicator 37 and a light-off signal to turn off the direction indicator 37. The light-on signal includes a right turn light-on signal, a left turn light-on signal, and a hazard light-on signal to simultaneously perform the right turn lighting and the left turn lighting.

The absolute position data acquisition unit 45 acquires absolute position data of the dump truck 2 from detection data of the position detector 35.

The storage unit 46 stores the traveling condition data of the dump truck 2 acquired by the wireless communication device 36. The traveling condition data includes the turn signal data to control the direction indicator 37.

Figure 7:
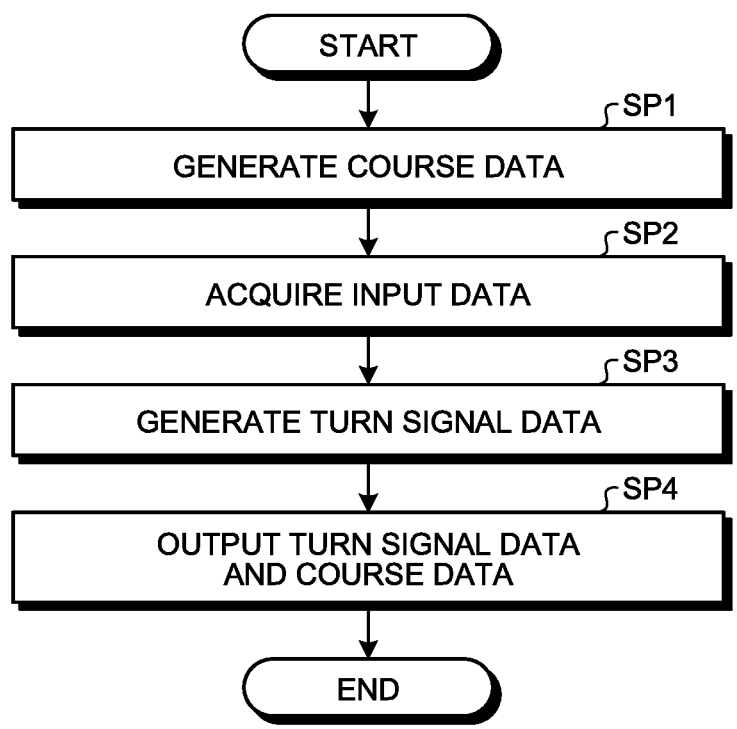
FIG. 7 is a flowchart illustrating an example of an operation of the management system according to the first embodiment.
Figure 8:
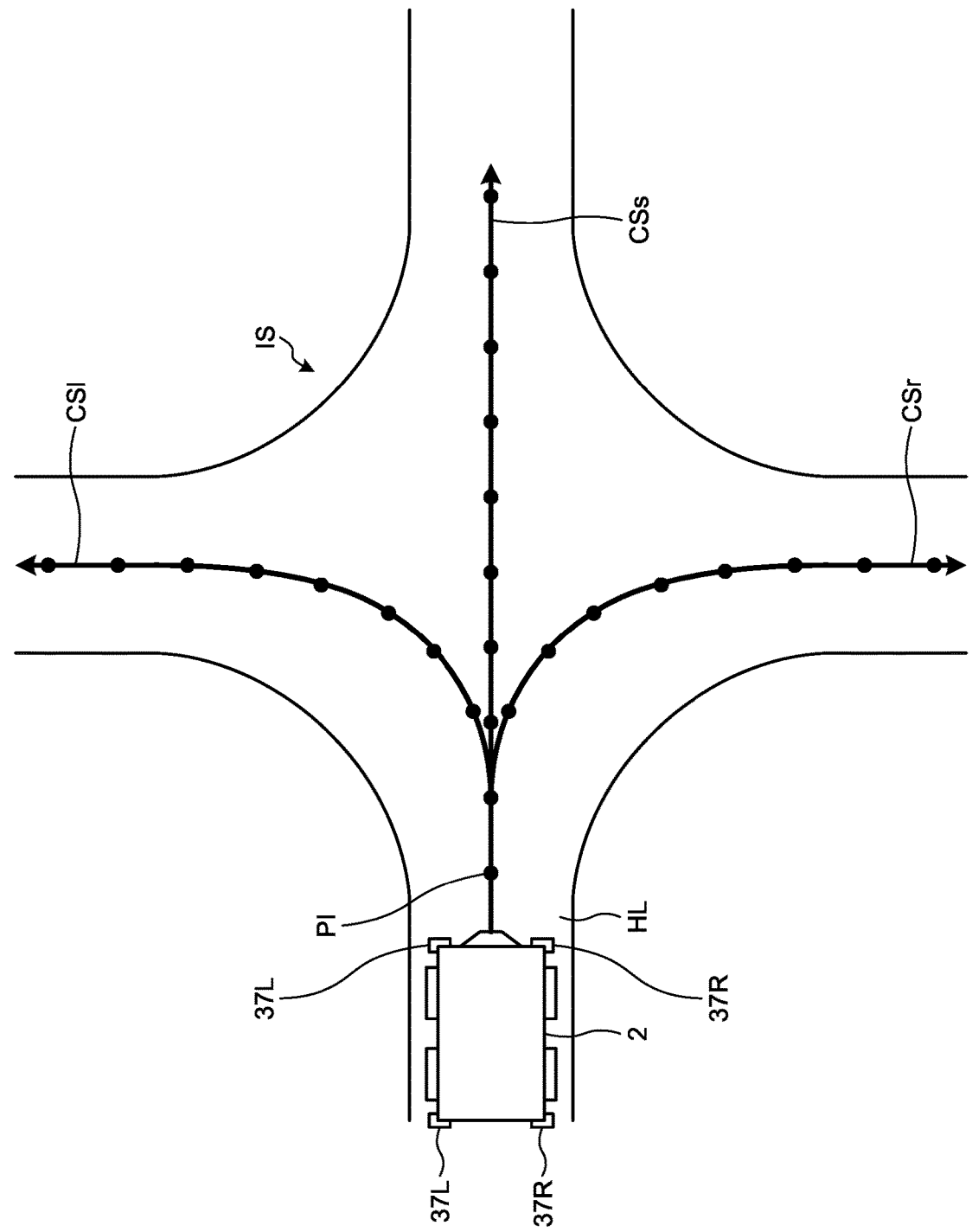
FIG. 8 is a view for describing traveling control and direction indicator control for the dump truck according to the first embodiment.

Next, a method of managing the dump truck 2 according to the present embodiment will be described. FIG. 7 is a flowchart illustrating an example of an operation of the management system 1 according to the present embodiment. FIG. 8 is a schematic view for describing traveling control and direction indicator control for the dump truck 2.

In the course data generation unit 122 of the management device 10, the traveling condition data including the course data CS of the dump truck 2 is generated (step SP1). The generated course data CS is displayed on the display device 16 of the management device 10.

While viewing the course data CS displayed on the display device 16, the administrator operates the input device 17 to set a course to operate the direction indicator 37 of the dump truck 2 in the mine and an operation range to operate the direction indicator 37 in the course. Operation range data to operate the direction indicator 37 in the mine is generated by operating the input device 17. The input data acquisition unit 121 acquires the input data generated by the operation of the input device 17 (step SP2).

The turn signal data setting unit 123 generates the turn signal data for controlling the direction indicator 37 of the dump truck 2 to each of the plurality of courses branching from the intersection IS of the course data CS based on the input data acquired by the input data acquisition unit 121 (step SP3).

The turn signal data setting unit 123 sets the generated turn signal data to the course point PI. The input/output unit 15 outputs the course data including the turn signal data to the dump truck 2 passing through the intersection IS via the wireless communication device 18 (step SP4).

FIG. 8 is a view schematically illustrating the intersection IS and a plurality of course data CSs, CSr, and CS1 branching from the intersection IS. The course data CS of the dump truck 2 including the intersection IS and the plurality of course data CSs, CSr, and CS1 branching from the intersection IS as illustrated in FIG. 8 is displayed on the display device 16. In addition, map data of the mine is displayed on the display device 16 together with the course data CS. For example, image data indicating the transport path HL is displayed on the display device 16 together with the course data CS as the map data.

The administrator operates the input device 17 to designate a specific course among the plurality of courses branching from the intersection IS. In the present embodiment, the input data acquired by the input data acquisition unit 121 includes designation data for designating the specific course among the plurality of courses branching from the intersection IS. The turn signal data setting unit 123 sets the turn signal data based on the designated specific course.

The administrator can specify the course data to operate the direction indicator 37 among the plurality of course data CSs, CSr, and CS1 branching from the intersection IS by viewing a screen of the display device 16 as illustrated in FIG. 8.

In FIG. 8, for example, the administrator can determine that it is not necessary to operate the direction indicator 37 in the course data CSs but it is necessary to turn on the turn signal lamp 37R for right turn in the course data CSr and to turn on the turn signal lamp 37L for left turn in the course data CS1. In that case, the course data CSr and CS1 can be specified as the specific course.

The administrator can select the course data CSr as the specific course by operating the input device 17 while viewing the display device 16 and set the turn signal data such that the turn signal lamp 37R of the dump truck 2 traveling on the course data CSr is operated.

Similarly to the above-described procedure, the administrator can set the turn signal data such that the turn signal lamp 37L of the dump truck 2 turning left at the intersection IS based on the course data CS1 is operated by operating the input device 17 while viewing the display device 16.

When the dump truck 2 traveling on the transport path HL approaches the intersection IS and passes through the intersection IS, the course data CS including turn signal data is output from the input/output unit 15 of the management device 10 to the dump truck 2 passing through the intersection IS. When the dump truck 2 passes through the intersection IS in accordance with the course data CSs, the direction indicator 37 is not turned on since the turn signal data is not set in the course data CSs. When the dump truck 2 passes through the intersection IS in accordance with the course data CSr, the turn signal lamp 37R of the direction indicator 37 is turned on or blinks since the turn signal data of the right turn signal is set in the course data CSr. When the dump truck 2 passes through the intersection IS in accordance with the course data CS1, the turn signal lamp 37L of the direction indicator 37 is turned on or blinks since the turn signal data of the left turn signal is set in the course data CS1.

As described above, according to the present embodiment, when the dump truck 2 travels on the mine based on the course data CS, the turn signal data is set based on the input data generated by the input device 17 operated by the administrator, and the direction indicator 37 is controlled based on the turn signal data, and thus, a driver of a manned vehicle around the dump truck 2 or a worker working in the mine can grasp the traveling direction of the dump truck 2. Therefore, the safety in the mine is improved.

In addition, the turn signal data is added to the course point PI using a man-machine interface including the display device 16 and the input device 17 in the present embodiment. Therefore, the direction indicator 37 of the dump truck 2 passing through the intersection IS in accordance with the course data is appropriately controlled. In addition, since the turn signal data is set such that the direction indicator 37 is turned off after the dump truck 2 has passed through the intersection IS, the direction indicator 37 is prevented from being continuously turned on indefinitely.

Second Embodiment

A second embodiment will be described. Constituent elements that are the same as or equivalent to those in the above-described embodiment will be denoted by the same reference numerals, and the description thereof will be simplified or omitted.

Figure 9:
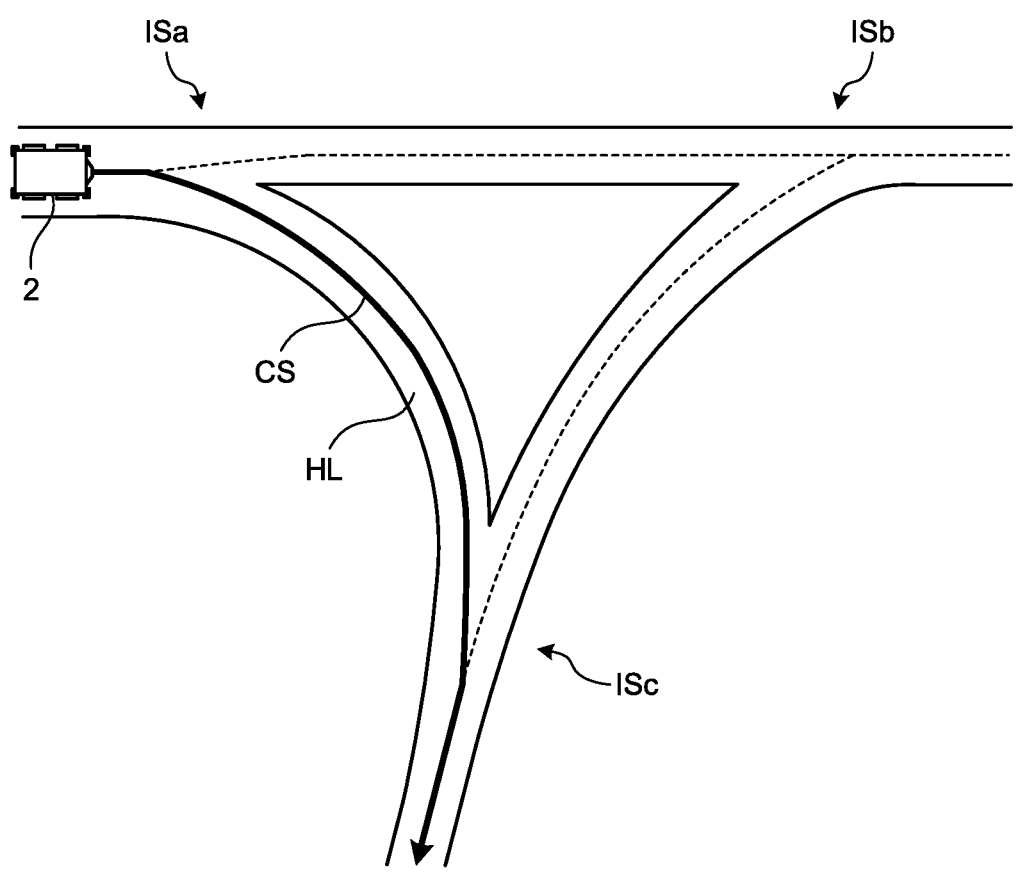
FIG. 9 is a view for describing traveling control and direction indicator control for a dump truck according to a second embodiment.

FIG. 9 is a view for describing traveling control and direction indicator control for a dump truck 2 according to the present embodiment. In the present embodiment, the course data CS includes a plurality of intersections ISa, ISb, and ISc. In the present embodiment, turn signal data is specified by a combination of arbitrary two intersections IS among the plurality of intersections ISa, ISb, and ISc. An administrator operates the input device 17 while viewing the display device 16 to select arbitrary two intersections IS among the plurality of intersections ISa, ISb, and ISc.

The administrator designates a first intersection through which the dump truck 2 passes among the plurality of intersections ISa, ISb, and ISc and a second intersection through which the dump truck 2 passes after passing through the first intersection by using the input device 17. In the present embodiment, the input data acquired by the input data acquisition unit 121 includes passage order data that designates the first intersection among the plurality of intersections ISa, ISb, and ISc and the second intersection through which the dump truck 2 passes after passing through the first intersection. The turn signal data setting unit 123 sets turn signal data based on the passage order data.

For example, when the dump truck 2 travels toward the intersection ISc after turning right at the intersection ISa in the example illustrated in FIG. 9, the intersection ISa is designated as the first intersection and the intersection ISc is designated as the second intersection. The passage order data includes the intersection ISa and the intersection ISc through which the dump truck 2 passes after passing through the intersection ISa. The turn signal data setting unit 123 sets the turn signal data based on the passage order data such that the turn signal lamp 37R for right turn is turned on or blinks when the dump truck 2 passes through the intersection ISa. The input/output unit 15 outputs the turn signal data for causing the turn signal lamp 37R for right turn to be turned on or blink to the dump truck 2 passing through the intersection ISa.

In addition, when the dump truck 2 enters the intersection ISb from the transport path HL at a right end in FIG. 9 and travels toward the intersection ISc after turning right at the intersection ISb, the intersection ISb is designated as the first intersection, and the intersection ISc is designated as the second intersection. The passage order data includes the intersection ISb and the intersection ISc through which the dump truck 2 passes after passing through the intersection ISb. The turn signal data setting unit 123 sets the turn signal data based on the passage order data such that the turn signal lamp 37L for left turn is turned on or blinks when the dump truck 2 passes through the intersection ISb. The input/output unit 15 outputs the turn signal data for causing the turn signal lamp 37L for left turn to be turned on or blink to the dump truck 2 passing through the intersection ISb.

As described above, arbitrary two intersections IS among the plurality of intersections ISa, ISb, and ISc are designated, and the turn signal data is set based on a positional relationship between the two intersections IS and the order of the two intersections IS in which the dump trucks 2 passes according to the present embodiment. As a result, it is possible to set the turn signal data with a simple method. Incidentally, an object to be designated is not limited to the intersection IS, but may be another destination, for example, a work site or the like.

Incidentally, the turn signal data is set based on arbitrary two intersections IS in the present embodiment. For example, the turn signal data may be set based on one intersection IS serving as a reference and an arbitrary destination. The destination may be an intersection different from the intersection IS serving as the reference or an arbitrary work site PA. That is, the turn signal data may be set based on the destination of the dump truck 2 and a reference intersection at which turn signal data is set in front of the destination.

Third Embodiment

A third embodiment will be described. Constituent elements that are the same as or equivalent to those in the above-described embodiment will be denoted by the same reference numerals, and the description thereof will be simplified or omitted.

Figure 10:
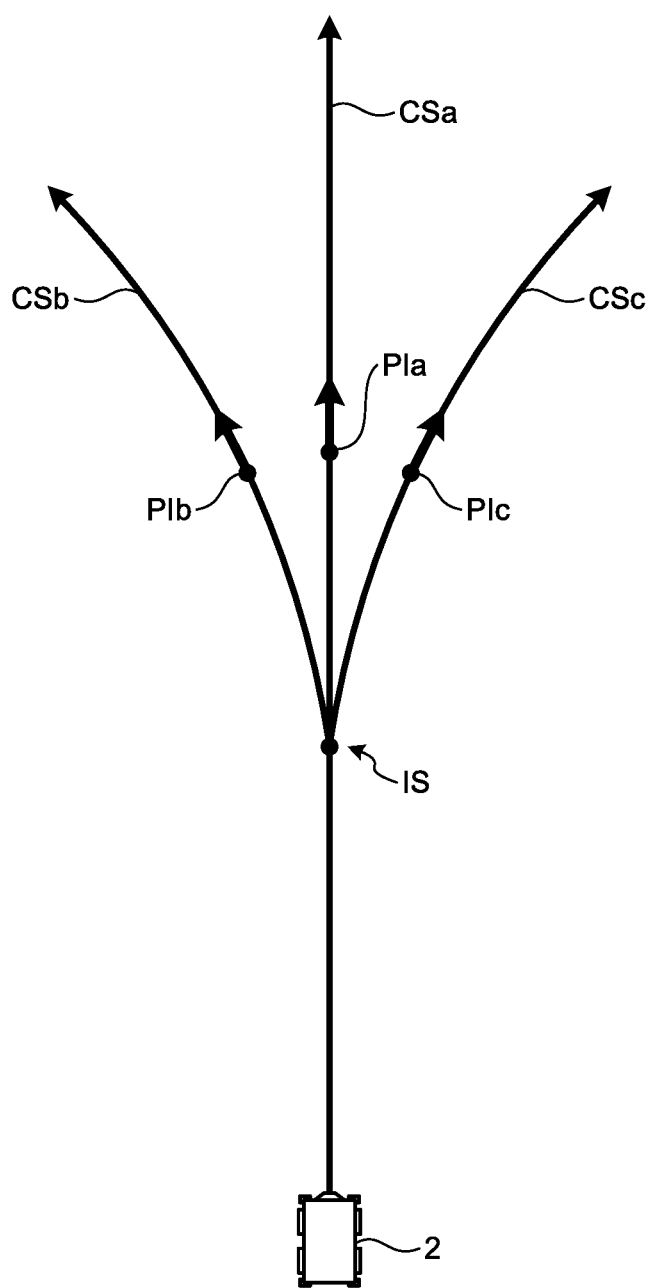
FIG. 10 is a view for describing traveling control and direction indicator control for a dump truck according to a third embodiment.

FIG. 10 is a view for describing traveling control and direction indicator control for a dump truck 2 according to the present embodiment. In the present embodiment, an administrator operates the input device 17 while viewing the display device 16 to designate a road course in which the direction indicator 37 is not operated among course data CSa, CSb, and CSc indicating a plurality of courses branching from an intersection (branch point) IS.

In the example illustrated in FIG. 10, road course data indicating the road course among the plurality of course data CSa, CSb, and CSc is the course data CSa. The administrator uses the input device 17 to designate the course data CSa which is the road course data among the plurality of course data CSa, CSb, and CSc. In the present embodiment, the input data acquired by the input data acquisition unit 121 includes road data designating the road course in which the direction indicator 37 is not operated among the plurality of courses branching from the intersection (branch point) IS.

Each of the plurality of course data CSa, CSb, and CSc is an aggregate of a plurality of course points PI. The turn signal data setting unit 123 receives orientation data (target orientation data) at the course point PI existing at a regulated distance from the intersection IS of the road course and each course different from the road course. That is, the turn signal data setting unit 123 receives orientation data of the course point PIa existing at the regulated distance from the intersection (branch point) IS among the course data CSa indicating the road course from the storage device 13 in which the course data is stored. In addition, the turn signal data setting unit 123 receives orientation data of each of the course points PIb and PIc existing at regulated distances from the intersection (branch point) IS among the course data CSb and CSc each of which indicates a course different from the road course from the storage device 13. The distance between the intersection (branch point) IS and the course point PIa, the distance between the intersection IS and the course point PIb, and the distance between the intersection IS and the course point PIc may be set to be equal.

In the present embodiment, the turn signal data setting unit 123 sets the turn signal data for causing the turn signal lamp 37L for left turn of the direction indicator 37 to be turned on or blink in the course data CSb based on an azimuth difference between the course point PIa of the course data CSa indicating the road course and the course point PIb of the course data CSb indicating another course.

In addition, the turn signal data setting unit 123 sets the turn signal data for causing the turn signal lamp 37R for right turn of the direction indicator 37 to be turned on or blink in the course data CSc based on an azimuth difference between the course point PIa of the course data CSa indicating the road course and the course point PIc of the course data CSc indicating the other course.

As described above, according to the present embodiment, the road course in which the direction indicator 37 is not operated is designated by the administrator so that the turn signal data setting unit 123 can automatically set the turn signal data for operating the direction indicator 37 to the dump truck 2 traveling in accordance with the other course data CSb and CSc based on the azimuth difference between the course points PIa of the road course and each of the course points PIb and PIc of the other courses. As described above, the course point PI includes the orientation data. Therefore, if the road course in which the direction indicator 37 is not operated is designated, the azimuth differences of the course points PIb and PIc of the other courses are derived with reference to the orientation data of the course point PIa of the road course. If an azimuth difference with respect to the course point PIa is equal to or larger than a threshold value, the other course may be recognized as a course curved from the intersection (branch point) IS. As a result, the turn signal data for operating the direction indicator 37 is set with a simple method. In addition, safety in a mine is improved by operating the direction indicator 37 of the dump truck 2 when traveling on the other course.

Fourth Embodiment

A fourth embodiment will be described. Constituent elements that are the same as or equivalent to those in the above-described embodiment will be denoted by the same reference numerals, and the description thereof will be simplified or omitted.

Figure 11:
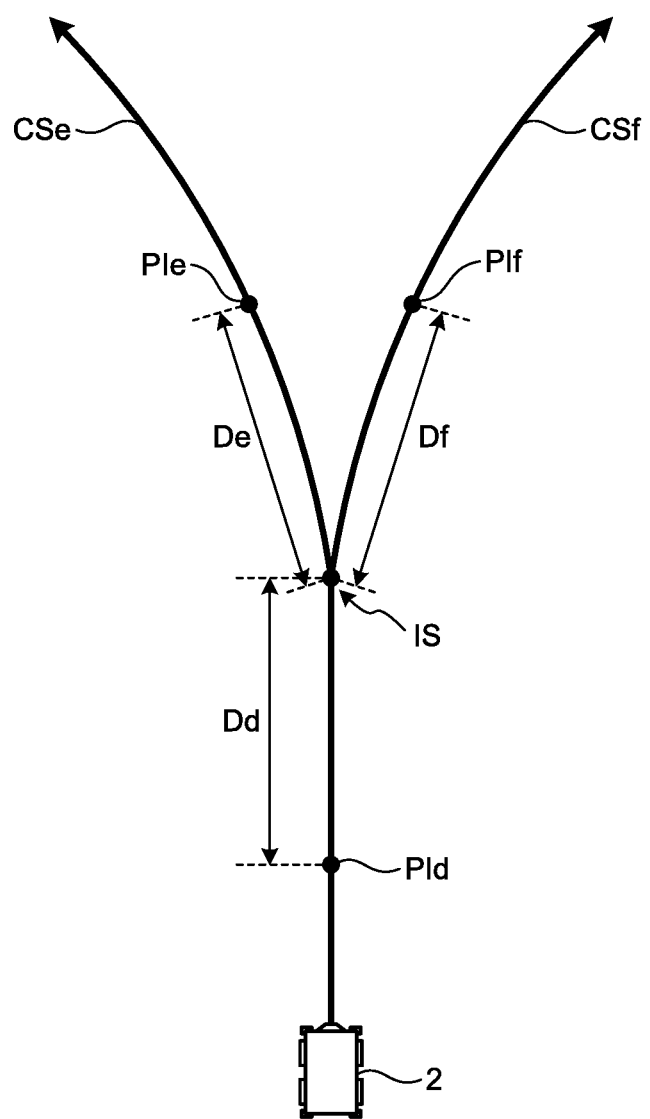
FIG. 11 is a view for describing traveling control and direction indicator control for a dump truck according to a fourth embodiment.

FIG. 11 is a view for describing traveling control and direction indicator control for a dump truck 2 according to the present embodiment. In the present embodiment, an example in which an operation start timing and an operation end timing of the direction indicator 37 are set based on a distance from the intersection IS will be described.

As illustrated in FIG. 11, the turn signal data setting unit 123 sets the operation start timing and the operation end timing of the direction indicator 37 based on the distance from the intersection IS. In the example illustrated in FIG. 11, the turn signal data setting unit 123 sets a timing at which the dump truck 2 passes through a course point PId existing behind the intersection IS by a regulated distance Dd in the traveling direction of the dump truck 2 as the operation start timing of the direction indicator 37.

For example, when the dump truck 2 passes through the intersection IS and travels in accordance with course data CSe, the turn signal data setting unit 123 sets the turn signal data such that the turn signal lamp 37L for left turn starts to operate at the timing at which the dump truck 2 passes through the course point PId. In addition, the turn signal data setting unit 123 sets a timing at which the dump truck 2 passes through a course point PIe existing ahead of the intersection IS by a regulated distance De in the traveling direction of the dump truck 2 as the operation end timing of the turn signal lamp 37L.

In addition, when the dump truck 2 passes through the intersection IS and travels in accordance with course data CSf, the turn signal data setting unit 123 sets the turn signal data such that the turn signal lamp 37R for right turn starts to operate at the timing at which the dump truck 2 passes through the course point PId. In addition, the turn signal data setting unit 123 sets a timing at which the dump truck 2 passes through a course point PIf existing ahead of the intersection IS by a regulated distance Df in the traveling direction of the dump truck 2 as the operation end timing of the turn signal lamp 37R.

As described above, the operation start timing and the operation end timing of the direction indicator 37 are set based on the distance from the intersection IS according to the present embodiment, and thus, the direction indicator 37 of the dump truck 2 passing through the intersection IS can start the operation and stop the operation at each appropriate timing.

Figure 12:
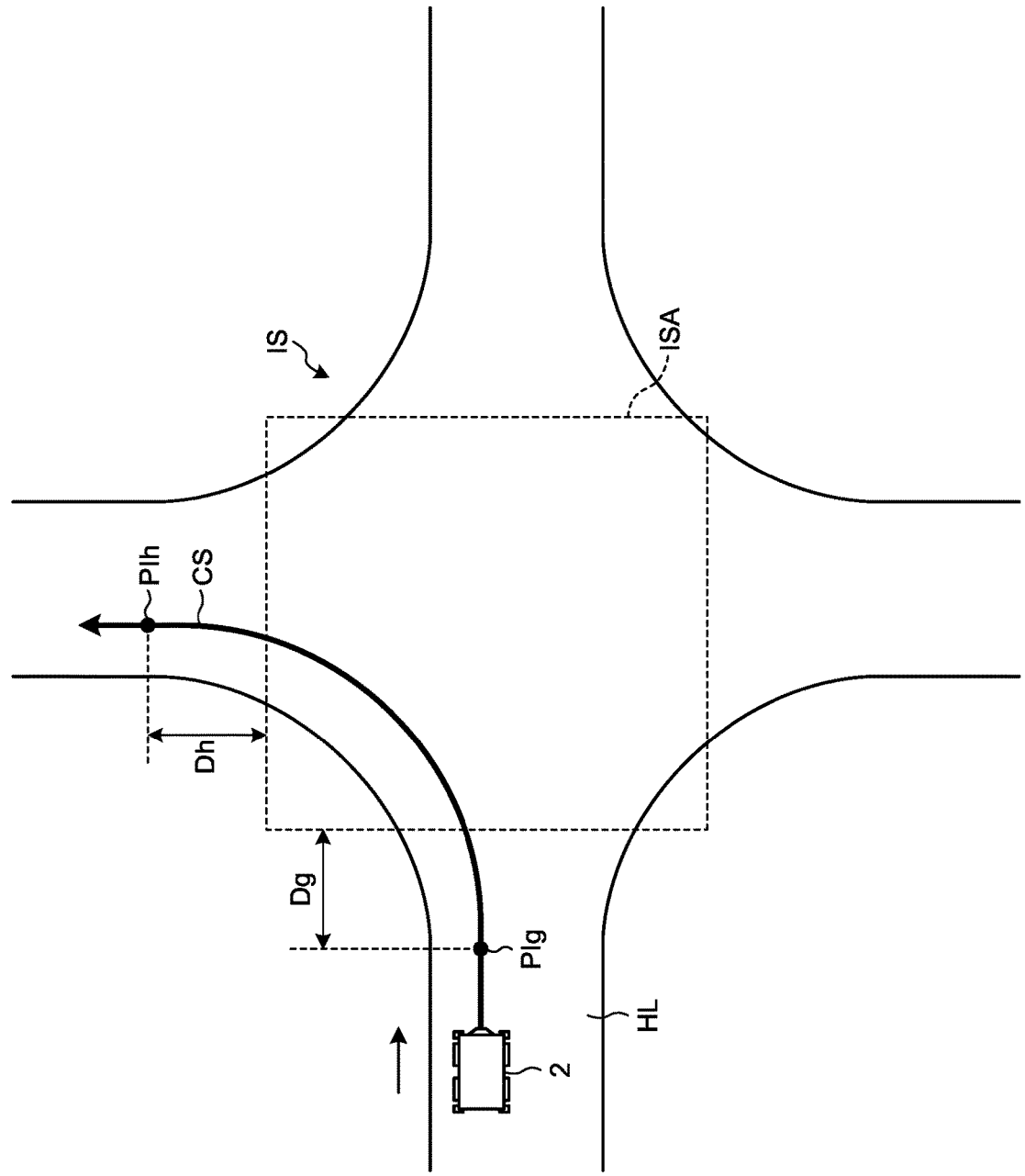
FIG. 12 is a view for describing traveling control and direction indicator control for the dump truck according to the fourth embodiment.

FIG. 12 illustrates a modification of the setting of turn signal data according to the present embodiment. As illustrated in FIG. 12, an intersection area ISA including the intersection IS may be set, and an operation start timing and an operation end timing of the direction indicator 37 may be set based on a distance from a boundary between the intersection area ISA and an area outside the intersection area ISA. When the dump truck 2 exists in the intersection area ISA, turn signal data is set so that the direction indicator 37 of the dump truck 2 is operated. In the present embodiment, each timing at which the dump truck 2 passes through each course point PI outside the intersection area ISA is set as each of the operation start timing and the operation end timing of the direction indicator 37.

In the example illustrated in FIG. 12, the dump truck 2 turns left at the intersection IS. In the example illustrated in FIG. 12, the turn signal data setting unit 123 sets the turn signal data such that the turn signal lamp 37L for left turn starts to operate when the dump truck 2 passes through a course point PIg outside the intersection area ISA. The turn signal data setting unit 123 sets the turn signal data such that the turn signal lamp 37L for left turn ends the operation when the dump truck 2 passes through a course point PIh outside the intersection area ISA. In the traveling direction of the dump truck 2, the course point PIg is set at a position behind the intersection area ISA by a regulated distance Dg, and the course point PIh is set at a position ahead of the intersection area ISA by a regulated distance Dh.

In the present embodiment, the turn signal data setting unit 123 may set a timing at which the dump truck 2 passes through the course point PI set at a position behind the intersection IS or the intersection area ISA by a regulated distance in the traveling direction of the dump truck 2 as an operation start timing of the direction indicator 37 and set a timing elapsed from the operation start timing by a specified time as an operation end timing of the direction indicator 37.

Incidentally, the turn signal data set by the turn signal data setting unit 123 is added to the traveling condition data generated by the course data generation unit 122, and the traveling condition data including the turn signal data is stored in the storage device 13 and transmitted from the management device 10 to the dump truck 2 in the respective embodiments described above. The traveling condition data may be transmitted from the management device 10 to the dump truck 2, and the turn signal data may be transmitted from the management device 10 to the dump truck 2 traveling in accordance with the traveling condition data every predetermined time. In addition, the processing device 12 including the course data generation unit 122, the turn signal data setting unit 123, and the like may be provided in a system inside the dump truck 2.

Incidentally, the dump truck 2 is the unmanned dump truck in the respective embodiments described above. The dump truck 2 may be a manned dump truck that travels in accordance with the driver's operation. In the manned dump truck, an operation device such as a turn signal lever, which operates the direction indicator 37, is provided, and the operation device is operated by the driver. When the dump truck 2 turns right or left at the intersection IS, even if the driver neglects operating the operation device, the control system 20 intervenes in the operation of the operation device and causes the direction indicator 37 to be turned on or blink. That is, the control system 20 executes a so-called assist control that assists the driver's operation. As a result, the safety in the mine is secured.

Incidentally, a work machine is the dump truck that operates in the mine on the ground in the respective embodiments described above. The work machine may be a mining machine such as a wheel loader that operates in the mine on the ground.

Incidentally, the description has been given in the respective embodiments described above by exemplifying the case in which the work machine is the mining machine that operates in the mine, but the work machine is not limited to the mining machine. The constituent elements that have been described in the above-described embodiments can be applied to any work machine used in the work site.

REFERENCE SIGNS LIST

1 MANAGEMENT SYSTEM
2 DUMP TRUCK (MINING MACHINE)
3 OTHER MINING MACHINE
4 MINING MACHINE
5 POSITIONING SATELLITE
6 REPEATER
7 CONTROL FACILITY
9 COMMUNICATION SYSTEM
10 MANAGEMENT DEVICE
11 COMPUTER
12 PROCESSING DEVICE
13 STORAGE DEVICE
15 INPUT/OUTPUT UNIT
16 DISPLAY DEVICE
17 INPUT DEVICE
18 WIRELESS COMMUNICATION DEVICE
18A ANTENNA
20 CONTROL SYSTEM
21 TRAVELING DEVICE
22 VEHICLE MAIN BODY
23 VESSEL
24 DRIVE DEVICE
25 CONTROL DEVICE
26 WHEELS
27 AXLES
28 BRAKE DEVICE
29 STEERING DEVICE
31 TRAVELING SPEED DETECTOR
32 ACCELERATION DETECTOR
36 WIRELESS COMMUNICATION DEVICE
37 DIRECTION INDICATOR
37L TURN SIGNAL LAMP
37R TURN SIGNAL LAMP
41 INPUT/OUTPUT UNIT
42 OPERATION CONTROL UNIT
43 TURN SIGNAL DATA ACQUISITION UNIT
44 TURN SIGNAL CONTROL UNIT
45 ABSOLUTE POSITION DATA ACQUISITION UNIT
46 STORAGE UNIT
121 INPUT DATA ACQUISITION UNIT
122 COURSE DATA GENERATION UNIT
123 TURN SIGNAL DATA SETTING UNIT
124 ABSOLUTE POSITION DATA ACQUISITION UNIT
CR CRUSHER
DPA DISCHARGING SITE

HL TRANSPORT PATH
IS INTERSECTION
LPA LOADING SITE
PA WORK SITE
RP TARGET TRAVELING ROUTE.

The invention claimed is:

1. A work machine management system, the work machine traveling in accordance with course data including a plurality of course points, comprising:
an input data acquisition unit implemented in a processor and configured to acquire input data generated by an operation of an input device;
a turn signal data setting unit configured to set turn signal data for controlling turn-on and turn-off of a direction indicator of the work machine to each course point of a designated course among a plurality of courses which branch off from an intersection based on the input data; and
an output unit capable of transmitting data to the work machine via a wireless communication device and configured to output to the work machine the course data, including the each course point which is preset with the turn signal data, for controlling the direction indicator when the work machine is traveling according to the course data.

2. The work machine management system according to claim 1, wherein
the input data includes designation data designating a specific course among the plurality of courses branching from the intersection, and
the turn signal data setting unit sets the turn signal data based on the specific course.

3. The working machine management system according to claim 1, wherein
the input data includes passage order data designating the intersection and a destination that the work machine passes after passing through the intersection, and
the turn signal data setting unit sets the turn signal data at the intersection based on the passage order data.

4. The work machine management system according to claim 3, wherein
the destination includes a second intersection which is an intersection different from the intersection.

5. The work machine management system according to claim 1, wherein
the input data includes road data designating a road course to follow a road in which the direction indicator is not operated among the plurality of courses which branch off from an intersection, and
the turn signal data setting unit receives orientation data of the road course and other courses different from the road course among the plurality of courses which branch off from the intersection, and sets the turn signal data for operating the direction indicator to one of the other courses based on an azimuth difference between the road course and the one of the other courses.

6. The work machine management system according to claim 5, wherein
the turn signal data setting unit sets the turn signal data for operating the direction indicator to the other course based on an azimuth difference at a course point existing at a regulated distance from the intersection of each of the other courses different from the road course.

7. The work machine management system according to claim 1, wherein
the turn signal data setting unit sets an operation start timing and an operation end timing of the direction indicator based on a distance from the intersection.

* * * * *